US010824500B1

(12) United States Patent
Shoemaker et al.

(10) Patent No.: US 10,824,500 B1
(45) Date of Patent: Nov. 3, 2020

(54) SYSTEMS AND METHODS FOR VERIFYING VEHICLE IDENTIFICATION NUMBER (VIN)

(71) Applicant: UNITED SERVICES AUTOMOBILE ASSOCIATION (USAA), San Antonio, TX (US)

(72) Inventors: Michael Shoemaker, Boerne, TX (US); Scott Weber, San Antonio, TX (US)

(73) Assignee: UNITED SERVICES AUTOMOBILE ASSOCIATION (USAA), San Antonio, TX (US)

(*) Notice: Subject to any disclaimer, the term of this patent is extended or adjusted under 35 U.S.C. 154(b) by 196 days.

(21) Appl. No.: 16/138,935

(22) Filed: Sep. 21, 2018

Related U.S. Application Data

(60) Provisional application No. 62/562,022, filed on Sep. 22, 2017.

(51) Int. Cl.
*G06F 11/10* (2006.01)
*G07C 5/12* (2006.01)
*G06Q 40/08* (2012.01)
*G06F 11/14* (2006.01)

(52) U.S. Cl.
CPC ...... *G06F 11/1004* (2013.01); *G06F 11/1479* (2013.01); *G06Q 40/08* (2013.01); *G07C 5/12* (2013.01)

(58) Field of Classification Search
CPC .......... G06F 11/1004; H04L 9/32; G07C 5/08
See application file for complete search history.

(56) References Cited

U.S. PATENT DOCUMENTS

| 5,870,018 | A  | * | 2/1999  | Person ..................... | B60R 25/10 307/10.2 |
| 6,092,193 | A  | * | 7/2000  | Loomis ................. | H04L 9/3236 713/168 |
| 8,660,943 | B1 | * | 2/2014  | Chirehdast ............ | G06Q 40/00 705/38 |
| 2005/0267754 | A1 | * | 12/2005 | Schultz ................... | G10L 15/10 704/252 |
| 2018/0025392 | A1 | * | 1/2018  | Helstab ................. | G06Q 10/06 705/306 |
| 2020/0118362 | A1 | * | 4/2020  | Debu ................... | G07C 5/0808 |

* cited by examiner

*Primary Examiner* — Giovanna B Colan
(74) *Attorney, Agent, or Firm* — Fletcher Yoder, P.C.

(57) ABSTRACT

A VIN verification system allow an accurate detection of incorrectly entered VIN in an electronic file followed by correction of the incorrectly entered VIN. A server of the VIN verification system verify characters and letters of the VIN in the electronic file to detect data entry and/or transmission errors. The server upon determining that the characters and entered in the VIN are incorrect will then replace the characters and letters with alternate or substitute characters and letters and generate a new VIN in the electronic file. The server will reexamine the new VIN to validate the new VIN, and then transmit the electronic file to another web application for further processing.

20 Claims, 5 Drawing Sheets

US 10,824,500 B1

SYSTEMS AND METHODS FOR VERIFYING VEHICLE IDENTIFICATION NUMBER (VIN)

CROSS REFERENCES TO RELATED APPLICATIONS

This application claims priority to U.S. Provisional Application Ser. No. 62/562,022, filed Sep. 22, 2017, which is hereby incorporated by reference in its entirety.

TECHNICAL FIELD

This application relates generally to iterative validation on electronic inputs, such as electronic vehicle identification number systems, and in particular relates to methods and systems for authenticating vehicle identification numbers (VINs).

BACKGROUND

Vehicle identification numbers (VINs) are common mechanisms for identifying vehicles. Generally, a VIN is a unique alphanumeric character sequence assigned to a new vehicle by its manufacturer. The VIN plates are useful in verifying the identity of the vehicle. For example, because the VIN contains information on a distinct year, make, model, and body type of a particular vehicle, it is possible to deconstruct the information embedded in the VIN and validate the year, the make, the model, and the body type of the vehicle. In some circumstances, such as when a vehicle is damaged, an owner of the vehicle may file a claim with company that may require the owner to input a VIN of the damaged vehicle. The company may then decode the VIN in order to find information associated with standard options for the vehicle from a manufacturer proprietary vehicle database, also referred to as a vehicle identification key since an accurate vehicle information is essential to obtaining accurate repair cost of the vehicle and valuation data of the vehicle.

As the processing power of computers has expanded and the Internet technology era has allowed fast and easy communications among electronic devices, these claims are often submitted via various applications executing on the users' electronic devices. For instance, a user may access a claim application via a web browser and input the VIN and other relevant information in one or more input fields displayed on such web browser. Upon examination of these electronic claim transmittals, it has been observed that many users input inaccurate VINs.

When an inaccurate VIN is inputted, the server processing the application may have to transmit the application, e.g., data inputted by the user, to a human agent for further processing. This solution is costly, tedious, and time-consuming. Numerous companies have estimated the cost of processing the inaccurate or incorrect claims to cost millions of dollars annually. Moreover, manually identifying the correct VIN is highly dependent on each agent's subjective skills. Furthermore, by transmitting the application to a human agent the server may not provide fast results to the user, which creates significant negative user experience. For instance, users expect to receive the result of their application in real time or near real-time. However, the process of transmitting the application to a human agent and verifying the VIN manually will inevitably take longer than an automatic and proactive verification. Manual verification processes also require users to abandon the application until the verification is completed. For instance, a user may not be able to complete the application in one sitting which creates significant negative user experiences and is highly undesirable for users. Because users expect results within seconds after inputting the information, manual verification processes are undesirable, costly, and impractical. When the inaccurate VIN is not identified as being incorrectly-entered, the processing of the VIN will cause numerous errors throughout the process, and those errors are difficult to trace to the source of the error, especially when the incorrect VIN represents another vehicle.

SUMMARY

For the aforementioned reasons, what is therefore needed is a technical solution to effectively and efficiently determine when data such as VIN in any digital or electronic document is inaccurate because of an error and/or a fraudulent activity. What is further desired are VIN verification systems and methods that automatically decode a VIN of a vehicle in its digital form and correct the incorrectly-entered VIN, and thereby resolving significant problems associated with the tracking of the vehicle caused due to presence of the incorrectly-inputted VIN. When processing of the electronic file contains an incorrect VIN, associated issues will propagate throughout the process and may be difficult to track the root cause of those issues.

Embodiments of a technical solution disclosed herein may enable an accurate detection of incorrectly entered VINs in any digital applications followed by correction/rectification of the incorrectly entered VINs in the digital applications. In an embodiment, a server of a VIN verification system may inspect a VIN by examining one or more characters and/or one or more letters in one or more fields in one or more location positions in the VIN to detect data entry and/or transmission errors at any field at any location positions in the VIN. The server upon determining that the one or more characters and/or one or more letters entered in the one or more fields of the VIN are incorrect may then replace one or more characters and/or one or more letters in the one or more fields with alternate or substitute correct characters and/or letters, and generate a new VIN and replace it with the original VIN in the digital application. The server may then reexamine the new VIN in the digital application to determine if the new VIN is correct, and upon determining the correctness of the new VIN may then transmit all correct data associated with the digital application to another executable program for further processing.

In one embodiment, a server-implemented method may include receiving, by a server, from a computing device, an electronic file comprising a VIN identifying a vehicle of a user, wherein the VIN comprises a plurality of characters where at least one character of the plurality of characters comprises a check digit. The server-implemented method may further include calculating, by the server, a checksum value of the check digit based on values of remaining characters of the plurality of characters of the VIN using a pre-determined protocol. The server-implemented method may further include comparing, by the server, the checksum value of the check digit with a received value of the check digit to verify the validity of the VIN, wherein the VIN is validated when the checksum value of the check digit matches the received value of the check digit. The server-implemented method may further include, in response to the server determining that the checksum value of the check digit does not match with the received value of the check digit, identifying, by the server, one or more characters in the VIN based on one or more substitution rules, wherein the one or more substitution rules are associated with a list of pre-defined substitute characters. The server-implemented method may further include iteratively generating and selecting, by the server, one or more new VINs, in accordance with the one or more substitution rules, wherein with each iteration, the server: automatically modifies at least one character of the one or more characters identified in the VIN with a corresponding substitute character from the list of pre-defined substitute characters based on the one or more substitution rules applicable to the one or more characters identified in the VIN; generates a new VIN based on automatic modification of the at least one character identified in the VIN with the corresponding substitute character; calculates a checksum value of a check digit for the new VIN based on values of remaining characters of a plurality of characters in the new VIN using the pre-determined protocol; compares the checksum value of the check digit for the new VIN with a value of the check digit in the new VIN to verify the validity of the new VIN; and selects the new VIN when the checksum value of the check digit of the new VIN matches with the value of the check digit of the new VIN to validate the new VIN; in response to validating the new VIN, updating, by the server, the VIN in the electronic file with the new VIN and transmitting, by the server, an instruction file along with validated data comprising the new VIN in the electronic file to an executable application, whereby the executable application receives the electronic file only after validation.

In another embodiment, a server-implemented method may include receiving, by a server from a computing device of a user, an electronic file comprising a VIN identifying a vehicle, wherein the VIN comprises a plurality of characters located at a plurality of field positions where at least one character of the plurality of characters comprises a check digit. The server may further include calculating, by the server, a checksum value of the check digit based on values of remaining characters of the plurality of characters of the VIN using a pre-determined protocol. The server may further include comparing, by the server, the checksum value of the check digit with a received value of the check digit to verify the validity of the VIN, wherein the VIN is validated when the checksum value of the check digit matches the received value of the check digit. The server may further include, in response to the server determining that the checksum value of the check digit does not match with the received value of the check digit, automatically transposing, by the server, each of the plurality of characters in the VIN with their adjacent character. The server may further include generating, by the server, one or more new VINs, wherein each of the one or more new VINs comprises the plurality of characters of the VIN where at least one character of the plurality of characters is automatically swapped with an adjacent character of the at least one character of the plurality of characters. The server may further include iteratively selecting, by the server, the one or more new VINs, in accordance with a set of rules, wherein with each iteration, the server: calculates a checksum value of a check digit for each of the one or more new VINs based on values of remaining characters of the plurality of characters of each of the one or more new VINs using the pre-determined protocol; compares the checksum value of the check digit for each of the one or more new VINs with a value of the check digit in each of the one or more new VINs to verify the validity of the one or more new VINs; and selects new VINs of the one or more new VINs when the checksum value of the check digit of the new VINs matches with the value of the check digit of the new VINs to validate at least one new VIN; in response to validating the at least one new VIN, updating, by the server, the VIN in the electronic file with the at least one new VIN and transmitting, by the server, an instruction file along with validated data comprising the at least one new VIN in the electronic file to an executable application, whereby the executable application receives the electronic file only after validation.

In yet another embodiment, a system may include a computing device, and a server in communication with the computing device. The server is configured to: receive from the computing device an electronic file comprising a vehicle identification number (VIN) identifying a vehicle of a user, wherein the VIN comprises a plurality of characters where at least one character of the plurality of characters comprises a check digit; automatically modify each of the plurality of characters in the VIN except for the check digit with one or more alternate characters; iteratively generate one or more new VINS, in accordance with the automatic modification of each of the plurality of characters in the VIN except for the check digit with the one or more alternate characters, wherein with each iteration, the server is further configured to modify at least one character of the plurality of characters in the VIN except for the check digit with an alternate character of the one or more alternate characters; generate a new VIN based on modification of the at least one character of the plurality of characters in the VIN except for the check digit with the alternate character; determine whether the new VIN is invalid based on execution of a set of rules, wherein the set of rules correspond to a pre-defined list of values to be contained in each field position in the new VIN; calculate a checksum value of a check digit for the new VIN if the new VIN is not invalid based on values of remaining characters of the plurality of characters of the new VIN using a pre-determined protocol; compare the checksum value of the check digit for the new VIN with a value of the check digit in the new VIN to verify the validity of the new VIN; select the new VIN when the checksum value of the check digit of the new VIN matches with the value of the check digit of the new VIN to validate the new VIN; and in response to validating the new VIN, updating, by the server, the VIN in the electronic file with the new VIN and transmitting, by the server, an instruction file along with validated data comprising at least the new VIN in the electronic file to an executable application, whereby the executable application receives the electronic file only after validation.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter as claimed.

DETAILED DESCRIPTION

Figure 1:
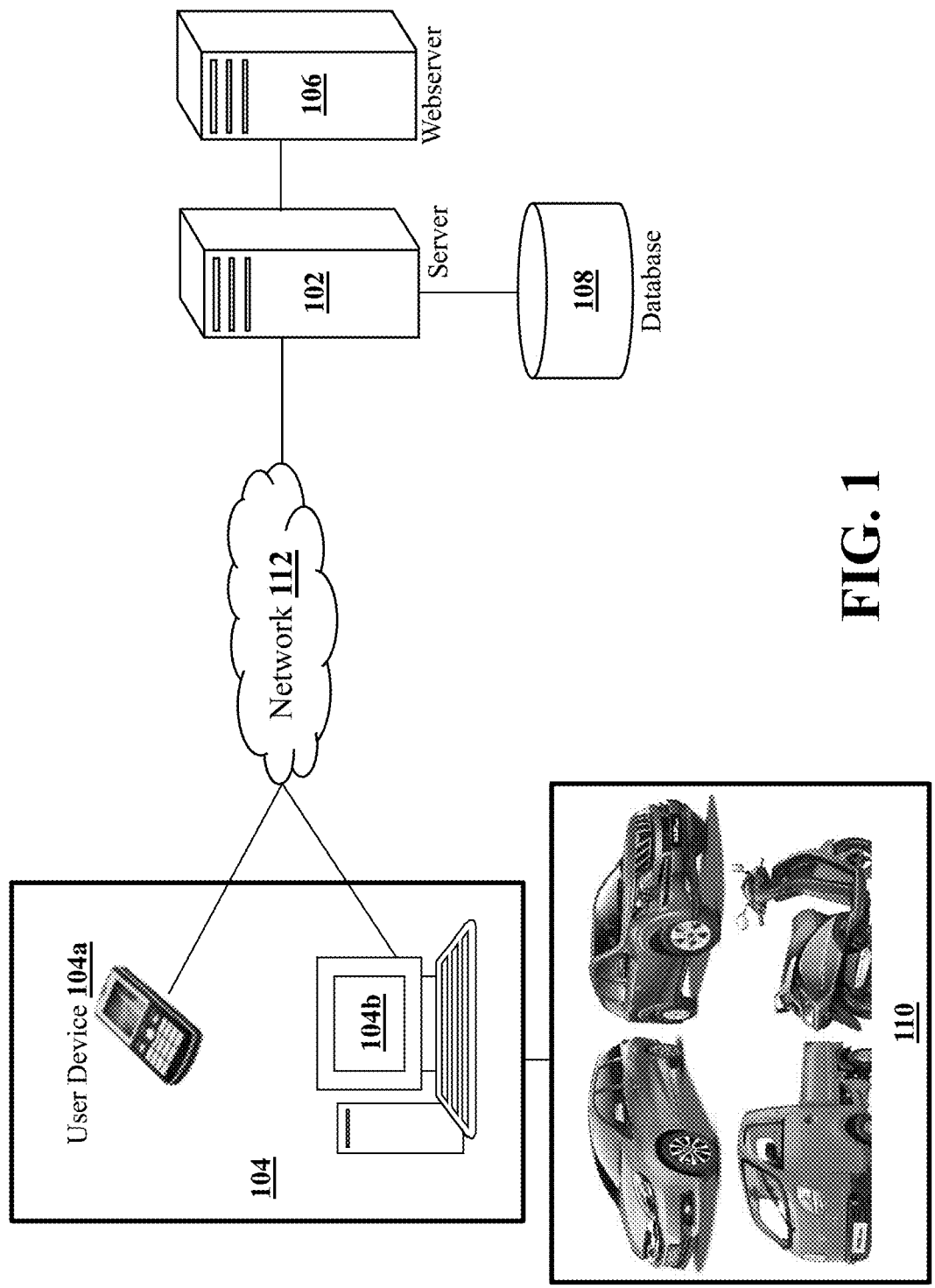
FIG. 1 shows various components of a system for verifying VINs, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 shows various components of a system 100 for verifying VINs. The system 100 may include servers 102, user devices 104, webservers 106, databases 108, and vehicles 110. A server 102, a user device 104, a webserver 106, and a database 108 may be connected to each other through a network 112. The examples of the network 112 may include, but are not limited to, private or public LAN, WLAN, MAN, WAN, and the Internet. The network 112 may include both wired and wireless communications according to one or more standards and/or via one or more transport mediums. The communication over the network 112 may be performed in accordance with various communication protocols such as Transmission Control Protocol and Internet Protocol (TCP/IP), User Datagram Protocol (UDP), and IEEE communication protocols. In one example, the network 112 may include wireless communications according to Bluetooth specification sets, or another standard or proprietary wireless communication protocol. In another example, the network 112 may also include communications over a cellular network, including, e.g. a GSM (Global System for Mobile Communications), CDMA (Code Division Multiple Access), EDGE (Enhanced Data for Global Evolution) network.

The system 100 described herein operate in a local computing environment where a user device 104 may transmit an electronic file and/or a digital document containing digital data to a server 102. The data and programs (e.g., web browser) corresponding to the user device 104 and the server 102 may be stored and executed on local computing resources. In some embodiments, the system 100 described herein operates in a cloud computing environment where a user device 104 may be cloud-optimized and generate a claim request for a damaged or stolen vehicle comprising the claim data in the electronic file. The user device 104 data and application programs may be stored and executed on a remote cloud-based server accessed over a network cloud. In the cloud-computing environment, a web browser on the user device 104 may interface with an application program that is executed on the remote cloud-based server. Through the web browser on the user device 104, a user can generate the electronic file and/or the digital document containing a request for claim for a damaged or stolen vehicle, where the request includes data about the vehicle, and transmit the electronic file and/or the digital document to the remote cloud-based server for further processing of the request.

In some embodiments, a user device 104 may initiate a request for a purchasing a user vehicle or a new vehicle. For instance, through a web browser on the user device 104, a user can generate an electronic file and/or a digital document containing the request for purchasing the new vehicle or the used vehicle, where the request includes data about the new vehicle or the used vehicle. The user device 104 may then transmit the electronic file and/or the digital document to the remote cloud-based server for further processing. In some embodiments, a user device 104 may execute a request for creating a list of inventory of newly manufactured vehicles. For instance, through the web browser on the user device 104, a user can generate an electronic file and/or a digital document containing the list of inventory of newly manufactured vehicles, where the electronic file includes data about the newly manufactured vehicles. The user device 104 may then transmit the electronic file and/or the digital document to the remote cloud-based server for further processing.

In operation, when a vehicle is damaged, a user (e.g., an owner of the vehicle or other individual) may complete an online form using a user device 104 to input data about the vehicle. The online form may pre-populate various fields, and once remaining fields are completed, the server generates an electronic file from the inputs and fields of the online form to transmit with instructions to another executable application for further processing. The online form may be executed in a web browser or other application on the user device 104. The various data fields will include a VIN field that auto-populates with a previously scanned or inputted VIN. In one embodiment, a VIN may be scanned or captured from a camera, and the server may use optical character recognition to obtain alphanumeric characters from the scanned or captured image. In another embodiment, a user may input the VIN into a user interface on the user device. Once the VIN is included in the data of the online form, the server generates instructions for further processing. However, because of the challenges with processing a file that includes incorrect data, the server will validate the data before transmitting the file to another application. As described herein, the server can automatically replace incorrect characters of a submitted file and generate correct instructions using the proper characters.

Upon receiving inputs in the required fields (e.g., VIN) from the user device 104 and/or other sources, the server 102 will decode the VIN. The server 102 may decode the VIN to determine a matching vehicle (a vehicle associated with the VIN) and validity of the VIN. The server 102 may determine the validity of the VIN since accurate vehicle information is essential to obtaining accurate repair cost and vehicle valuation data. The server 102 may determine the validity of the VIN by assessing whether the received VIN in the claim data is valid by examining and evaluating a check digit in the received VIN. In response to the examination and the evaluation process of the check digit in the received VIN, the server 102 may determine that the received VIN is not valid, and in such a case, the server 102 may replace one or more incorrect characters at one or more positions in the VIN with alternate or substitute correct characters and/or correct letters to generate at least one new VIN. The server 102 may then reexamine and reevaluate the at least one new VIN to determine if the new VIN is valid in order to process data in the electronic file.

User devices 104 may be computing and/or telecommunications devices including a processor and capable of performing the various tasks and processes described herein, such as accessing a web server 106 and providing a GUI interface to a user/customer to interact with a customer-centric website hosted on the webserver 106. Non-limiting examples of a user device 104 may include a phone 104*a* (e.g., POTS landline telephone, cellular telephone, smartphone), a user computer 104*b* (e.g., desktop, laptop, server, tablet), or any other telecommunications or computing device used to communicate with the system 100 services. User device 104 may be either phone 104a or 104b and in either case is referred to herein as user device 104. The user device 104 has network connectivity. In some configurations, the user device 104 has a camera.

In some embodiments, a user device 104 may be any computing device allowing a user/customer to interact with a server 102. In some embodiments, the user device 104 may be any mobile device allowing a user to interact with the server 102 via a webserver 106. The user device 104 may execute an Internet browser or a local application that accesses the webserver 106 in order to issue requests and/or instructions to the server 102. In some embodiments, a user/customer may fill out a digital application on the user device 104 for a policy. The server 102 may then process the digital application.

In some embodiments, when a user already have a policy, a user device 104 may transmit credentials such as user identification inputs to a webserver 106 from which the webserver 106 may authenticate the user. The user device 104 may include any number of input devices configured to receive any number of data inputs (e.g., mouse, keyboard, touchscreen, stylus), including various types of data inputs allowing for authentication, e.g., username, passwords, certificates, biometrics. The user device 104 may be any computing device including a processor and non-transitory machine-readable storage medium allowing the user device 104 to perform the various tasks and processes described herein.

As a non-limiting example of a user device 104 operation, a user operating the user device 104 may execute an Internet browser that accesses a webserver 106 hosting a website (for example, a website of a company) or a software application (for example, a software application of a company) that allows the user to communicate with the server 102. Using the user device 104, the user may transmit personal data and/or a VIN of a vehicle on a customer-centric mobile application/website for filing of a claim corresponding to damage of the vehicle. As the communication proceeds, the user device 104 may be used by the user to upload machine-readable computer files (e.g., PDF, DOC, XSL) containing personal data and vehicle information. The computer files may be stored into document records in a database 108. The user device 104 may issue queries and/or instructions to the server 102 via the webpages generated by the webserver 106, which then instruct the server 102 to perform various tasks, such as processing of the vehicle related digital application submitted by the user device 104.

The vehicle information may include a VIN of a vehicle. The VIN is a unique, standardized identification number of the vehicle. The VIN may be mentioned in several different places on the vehicle, such as an engraved stamp on a dashboard just behind a windshield or on a side panel of a door of the vehicle. The vehicle may be a mobile vehicle such as a motorcycle, car, truck, recreational vehicle (RV), boat, plane, etc., and is equipped with suitable hardware and software that enables it to communicate over the network 112.

The VIN of the vehicle may include multiple sections having a world manufacturer identifier, a vehicle descriptor section that might indicate a model, and a vehicle identifier section. Each of the sections may have subsections. For example, the world manufacturer identifier may include a country field, a manufacturer field, and a type field. The vehicle identifier section may include a year code field, a plant field, and a sequence number. More specifically, the VIN may contain following sections: (1) the world manufacturer identification section that identifies the country and company that assembled the vehicle; (2) the model year of the vehicle, using a single-letter code that is standardized for all manufacturers; (3) the model description, in a format chosen by the manufacturer; (4) the manufacturing plant, in a format chosen by the manufacturer; (5) the serial number of the vehicle, in a format chosen by the manufacturer; and (6) a check digit used to validate the VIN's validity where the check digit is calculated using an algorithm which is standardized for all manufacturers.

A position of each VIN data field within a VIN may be standardized. In one non-limiting example of the VIN presented henceforth, data field positions 1-3 of the VIN describe a world manufacturer identification (WMI) of the vehicle. For instance, the first three characters in the first three data fields of the VIN are a three-character code that identifies a manufacturer of the vehicle according to a standard developed by the Society of Automotive Engineers. A first character of the WMI identifies a region of a world where the vehicle originated. In conjunction with the first character, a second character of the WMI refers to a country where the vehicle was finally assembled. A third character of the WMI is used to refer to a kind of the vehicle produced by a manufacturer. If the manufacturer produces 500 or more vehicles per year, the third character of the WMI identifies a kind of the vehicle. The data field positions 4-8 of the VIN describe a model of the vehicle. For instance, five characters in the data field positions 4-8 of the VIN describe a vehicle, and provide information such as the vehicle's make, line, series, body type, engine type, available restraint devices and gross vehicle weight. A data field position 9 of the VIN is a check digit for verifying an accuracy of the VIN. A data field position 10 of the VIN is a year code. For example, a tenth character of the VIN in the data field position 10 represents a model year of the vehicle. The values associated with the model years include the characters B, C, D, E, F, G, H, J, K, L, M, N, P, R, S, T, V, W, X, Y, 1, 2, 3, 4, 5, 6, 7, 8, 9 and A. A data field position 11 of the VIN is a plant code. For example, eleventh character of the VIN in the data field position 11 corresponds to a particular plant where the vehicle was finally assembled, and is thus specific to a particular vehicle manufacturer. The data field positions 12-17 of the VIN describe the serial number. For example, twelfth through seventeenth characters of the VIN in the data field positions 12-17 combine to form a unique production sequence number, or serial number, that corresponds to a specific vehicle.

Example of Seventeen Characters/Digits of a VIN in Seventeen Data Field Positions of the VIN

| 1 2 3 | 4 5 6 7 8 | 9 | 10 | 11 | 12 13 14 15 16 17 |
|---|---|---|---|---|---|
| WMI | Vehicle descriptor | Check digit | Model Year | Plant Code | Sequence Numbers |

In some embodiments, in a VIN while a first eight and tenth characters of the VIN may be common to the VINs of other vehicles having a same country of origin, manufacturer, body type, car line, restraint system, engine, braking system, year of manufacture, and final assembly point; final six characters of the VIN are unique to each individual vehicle. In addition, the twelfth through seventeenth characters of the VIN, as well as a check digit in a ninth character of the VIN, will be different for each specific vehicle. Additionally, where the vehicle is assembled by a manufacturer who produces fewer than 500 automobiles per year, i.e., where a third character of the WMI is a "9," the twelfth through fourteenth characters of the VIN also further identify a type of the vehicle, and fifteenth through seventeenth characters of the VIN represent a serial number of the vehicle.

A user may manually obtain a VIN found in several different places on a vehicle, such as an engraved stamp on a dashboard just behind a windshield or on a side panel of a door of the vehicle to submit in a digital application via a user device 104. The user device 104 may generate a VIN request and then transmit the VIN request to the vehicle for obtaining the VIN. A vehicle hardware processor associated with one or more electronic modules located throughout the vehicle may receive the VIN request for the VIN from the user device 104. Upon receiving the VIN request, the one or more electronic modules may then provide the VIN to the user device 104 or a designated recipient, such as an authorized vehicle user or a car dealership.

A webserver 106 may be a computing device hosting a software application accessible to a server 102 via an Internet. In some embodiments, the webserver 106 is a computing device hosting a website accessible to the user devices 104 via the Internet. The website or the software application hosted by the webserver 106 may provide an option to submit a digital application having information associated with a VIN of a vehicle. The webserver 106 may include a processor and a non-transitory machine-readable storage capable of executing various tasks and processes described herein. Non-limiting examples of the webserver 106 may include workstation computers, laptop computers, server computers, laptop computers, and the like. While the system 100 includes a single webserver 106, however, in some embodiments the webserver 106 may include any number of computing devices operating in a distributed computing environment.

The webserver 106 may execute software applications configured to host a website (e.g., Apache®, Microsoft IIS®), which may generate and serve various webpages on the user device 104 upon receiving a request from the user device 104. In some embodiments, the webserver 106 may execute software applications configured to host a website (e.g., Apache®, Microsoft IIS®), which may generate and serve various webpages to the server 102. The software application and/or the website may be used to generate and access data stored on a database 108. In some implementations, the webserver 106 may be configured to require user/customer authentication based upon a set of customer authorization credentials (e.g., username, password, biometrics, cryptographic certificate). In such implementations, the webserver 106 may access the database 108 configured to store user credentials, which the webserver 106 may be configured to reference in order to determine whether a set of entered credentials purportedly authenticating the user match an appropriate set of credentials that identify and authenticate the user. Similarly, in some implementations, the webserver 106 may generate and serve webpages (associated with a policy company of the user) to the user devices 104 based upon a user profile (for example, a type and a number of policies of the user) within the system 100. In such implementations, the user profile may be defined by information fields in the user records stored in the database 108, and authentication of the user may be conducted by the webserver 106 by executing an access directory protocol. The webserver 106 may then be instructed to generate webpage content, access or generate data stored in the database 108, according to the user profile defined in the user record in the database 108.

A server 102 may be a computing device including a processor and a non-transitory machine-readable storage medium, and capable of performing various tasks and processes described herein during execution. Non-limiting examples of the server 102 may include a desktop computer, a mobile device, a server computer, a laptop computer, a tablet computer, and the like. For ease of explanation, FIG. 1 shows a single computing device functioning as the server 102. However, some embodiments may include any number of computing devices capable of performing the various tasks described herein.

The server 102 may receive personal information from a user operating a user device 104. For example, in order to register to a website and/or a software application hosted by the server 102 providing a policy, the user may be required to provide personal information to the server 102. The server 102 may use the personal information provided by the user to create a profile of the user consisting information of one or more vehicles owned by the user such as a vehicle model number, vehicle mileage, and a policy for each of the one or more vehicles. The server 102 may store the user profile and the policies data of the user in a database 108. In some embodiments, the server 102 may transmit requests to the user device 104 after pre-determined time periods to receive updated personal data from the user, and based on updated data received from the user, the server 102 may update the user profile stored in the database 108.

The server 102 may receive a request from a user device 104 where the request may include information associated with processing of a claim. For example, the information contained within the request may include a VIN of a stolen or damaged vehicle. In some embodiments, the server 102 may receive the claim request from the user device 104 in a form of a document image specifying the claim. The document image may include multiple fields providing information related to the user name, the contact information of the user, and the VIN of the stolen or damaged vehicle. The server 102 upon receiving the document image may then process the document image. For example, the server 102 may determine whether the image of the document is already pre-cropped and binarized. The server 102 upon determining that the document image of the document is not pre-cropped and binarized, the server 102 may then preprocess the document image to frame, crop, binarize and clean up the document image for geometric correction. The preprocessing may include a preliminary data capture of, e.g., the VIN data in the document image.

In some embodiments, the server 102 may perform a preliminary data capture in the document image based on a keyword-based search of the VIN. The VIN field in the document image may have a keyword associated with it. For example, the VIN field in the document image may have one of the following keywords associated: VIN; V.I.N.; or Vehicle Identification Number. The key words may be used to locate the VIN field's location on VIN-carrying document images. The server 102 may search for the keywords in an OCR version of the document image, for example, by executing a Fuzzy Matching technique.

In some embodiments, the server 102 may perform a preliminary data capture in the document image based on a format-based search on the document image. For example, the VIN field's format is a combination of 17 digits and upper-case alphas, of which the last six characters are always digits. Accordingly, the server 102 may perform a processing of the data format of the VIN that may be used in combination with the keyword-based search to determine a set of candidates for the VIN field in the document image.

The server 102 upon determining a location of the VIN field in the document image may perform post-processing of the VIN field using multiple OCR engines. The server 102 may use multiple OCR engines to recognize each of the seventeen VIN characters and/or letters in the VIN field of the document image. The server 102 upon recognition of each of the seventeen VIN characters and/or letters in the VIN field of the document image may examine and/or process the different VIN characters and/or letters to detect VIN data entry, data capture, or transmission errors. The server 102 may determine whether the recognized seventeen VIN characters and/or letters in the VIN field of the document image are valid in a number of ways. For example, the server 102 may determine whether the recognized seventeen VIN characters and/or letters in the VIN field of the document image are valid by examining a check digit in the VIN. The check digit verification may be a redundancy check performed by the server 102 to identify if there are errors within the VIN, such as a mistyped character or digit. The ninth position in the VIN may represent a check digit of the VIN.

In some embodiments, the server 102 may calculate the check digit using a protocol and/or an algorithm. In some embodiments, the server 102 may calculate the check digit using a pre-determined protocol and/or algorithm. For instance, the server 102 may arithmetically calculate the check digit based on the values of the remaining 16 characters in the VIN, i.e., the first through eighth and tenth through seventeenth characters in the VIN. Firstly, where a character of the VIN is a letter, the server 102 transliterates the letter by assigning a numerical value to the character represented by letters in the VIN, as is set forth below in Table 1.

TABLE 1

Numerical Values Assigned to Characters in VINs for Calculating Check Digit

| Character | A | B | C | D | E | F | G | H | J | K | L |
|---|---|---|---|---|---|---|---|---|---|---|---|
|  | M | N | P | R | S | T | U | V | W | X | Y |
|  | Z |  |  |  |  |  |  |  |  |  |  |
| Numerical | 1 | 2 | 3 | 4 | 5 | 6 | 7 | 8 | 1 | 2 | 3 |
|  | 4 | 5 | 7 | 9 | 2 | 3 | 4 | 5 | 6 | 7 | 8 |
|  | 9 |  |  |  |  |  |  |  |  |  |  |

Secondly, where a character of the VIN is a number, the server 102 assigns said number as a numerical value for the character. Next, the server 102 applies a weight, or a multiplier, to each of the characters in the VIN, including both letters and numbers, as is set forth below in Table 2.

TABLE 2

Weights Assigned to Characters in VINs for Calculating Check Digit

| Character | 1 | 2 | 3 | 4 | 5 | 6 | 7 | 8 | 9 | 10 | 11 |
|---|---|---|---|---|---|---|---|---|---|---|---|
|  | 12 | 13 | 14 | 15 | 16 | 17 |  |  |  |  |  |
| Weight | 8 | 7 | 6 | 5 | 4 | 3 | 2 | 10 | 0 | 9 | 8 |
|  | 7 | 6 | 5 | 4 | 3 | 2 |  |  |  |  |  |

Finally, the server 102 may calculate the check digit by multiplying each of the numerical values associated with a character by its respective multiplier, adding the products together, and dividing the sum of the products by 11 to find a remainder.

The server 102 upon calculating a check digit based on the values of the other 16 characters in the VIN then match the calculated value of the check digit with a ninth character of the VIN received from the user device 104 to determine a validity of the VIN. The server 102 upon determining that the independently calculated value of the check digit match with the ninth character of the VIN received from the user device 104, the server 102 then validates the VIN received from the user device 104. In some embodiments, the server 102 upon determining that the independently calculated value of the check digit does not match with the ninth character of the VIN received from the user device 104, the server 102 then confirms that the VIN received from the user device 104 to be invalid.

If the VIN is determined to be invalid, then the server 102 executes one or more substitution rules on the VIN received from the user device 104 to correct the VIN. The server 102 executes the one or more substitution rules on the VIN received from the user device 104 to iteratively replace one or more characters and/or letters in the incorrect VIN received from the user device 104 with one or more pre-defined alternate/substitute characters. The one or more substitution rules may include replacing the characters and/or letters in the incorrect VIN such as, but not limited to, replacing "A" in the incorrect VIN received from the user device 104 with 4, "5" in the incorrect VIN received from the user device 104 with S, "Z" in the incorrect VIN received from the user device 104 with 2, "8" in the incorrect VIN received from the user device 104 with B, "G" in the incorrect VIN received from the user device 104 with 6, and "F" in the incorrect VIN received from the user device 104 with E. The server 102 upon replacing the one or more characters and/or letters in the incorrect VIN received from the user device 104 with the one or more pre-defined alternate/substitute characters based on the one or more substitution rules may generate one or more new VINs.

The server 102 may only replace one character and/or letter at a time in the incorrect VIN received from the user device 104 with a corresponding pre-defined alternate/substitute character based on the one or more substitution rules to generate a new VIN. For example, if the server 102 determines that there are five characters and/or letters in the incorrect VIN received from the user device 104 that have to be replaced based on the one or more substitution rules, then the server 102 may replace one character and/or letter at a time in the incorrect VIN received from the user device 104 with a corresponding pre-defined alternate/substitute character based on the one or more substitution rules such that a total of five new VINs are generated.

The server 102 may replace all characters and/or letters in the incorrect VIN received from the user device 104 with a corresponding pre-defined alternate/substitute characters and/or letters based on the one or more substitution rules to generate a new VIN. For example, if the server 102 determines that there are five characters and/or letters in the VIN received from the user device 104 that may be replaced based on the one or more substitution rules, then the server 102 may replace all the five characters and/or letters in the VIN received from the user device 104 with a corresponding pre-defined alternate/substitute characters and/or letters based on the one or more substitution rules such that only one new VIN is generated.

The server 102 upon generating the new VINs based on the execution of the one or more substitution rules on the incorrect VIN received from the user device 104 then determines the validity of each of the new VINs. The server 102 may determine whether the seventeen characters and/or letters in the new VINs are valid by examining a check digit in each new VIN. To examine the check digit, the server 102 may perform a redundancy check to identify if there are errors within the new VINs. For instance, the server 102 may calculate a check digit value for each of the new VINs based on values of other 16 characters in each of the new VINs to match the calculated value of the check digit for each of the new VINs with a ninth character of the corresponding new VIN to determine the validity of each of the new VINs. In one embodiment, when only one of the independently calculated check digit values matches the ninth character of only one of the new VIN, then that new VIN is presumed to be valid. In another embodiment, when two or more of the independently calculated check digit values matches the ninth character of two or more of the new VINs, then the two or more new VINs are presumed to be valid. In such a case, the server 102 may execute additional logic tests to the information provided in the two or more new VINs in order to confirm which new VIN of the two or more new VINs is valid. For example, if WMI in any of the two or more new VINs associated with a BMW X3 model sport-utility vehicle is 4US, indicating that the vehicle was assembled at a BMW plant in the United States, and the tenth character of any of the two or more new VINs is a 4, indicating that the model year is 2004, then that new VINs of the two or more new VINs may be invalid because the BMW X3 model sport-utility vehicle was first assembled in the United States in 2010. Likewise, the server 102 may execute logic tests or checks, which compares the information provided in the new VINs to externally available and verifiable information, to determine whether the new VINs are valid.

In one example case, the server 102 may receive a digital application including a VIN from a user device 104 operated by a user. The seventeenth character VIN may be 5TFUMSF15AX001351. The server 102 may then determine whether the VIN (5TFUMSF15AX001351) is valid by examining a check digit in the VIN (5TFUMSF15AX001351). To examine the check digit, the server 102 may perform a redundancy check to identify if there are errors within the VIN (5TFUMSF15AX001351), such as a mistyped character or digit. The ninth position (character 5) in the VIN (5TFUMSF15AX001351) may represent a check digit of the VIN (5TFUMSF15AX001351). The server 102 may calculate a value of the check digit using a check digit value algorithm. On execution of the check digit algorithm, the server 102 may mathematically calculate a value of the check digit based on the values of the remaining 16 characters in the VIN (5TFUMSF15AX001351), i.e., the first through eighth and tenth through seventeenth characters.

The server 102 upon calculating the check digit based on the values of the other 16 characters in the VIN (5TFUMSF15AX001351) may match a calculated value of the check digit with a ninth position (character 5) of the VIN (5TFUMSF15AX001351) received from the user device 104 to determine the validity of the received VIN (5TFUMSF15AX001351). The server 102 upon determining that the independently calculated value of the check digit does not match with the ninth position (character 5) of the VIN (5TFUMSF15AX001351) received from the user device 104, the server 102 then confirm that the VIN received from the user device 104 is invalid. The server 102 then executes one or more substitution rules on the VIN (5TFUMSF15AX001351) received from the user device 104 to correct the VIN. The server 102 executes the one or more substitution rules on the VIN (5TFUMSF15AX001351) received from the user device 104 to iteratively replace one or more characters and/or letters in the VIN (5TFUMSF15AX001351) received from the user device 104 with one or more pre-defined alternate/substitute characters. The one or more substitution rules may indicate replacing the characters and/or letters such as but not limited to "A" in the VIN (5TFUMSF15AX001351) received from the user device 104 with 4, "5" in the VIN (5TFUMSF15AX001351) received from the user device 104 with S, "Z" in the VIN (5TFUMSF15AX001351) received from the user device 104 with 2, "8" in the VIN (5TFUMSF15AX001351) received from the user device 104 with B, "G" in the VIN (5TFUMSF15AX001351) received from the user device 104 with 6, and "F" in the VIN (5TFUMSF15AX001351) received from the user device 104 with E. The server 102 upon replacing the one or more characters and/or letters in the VIN (5TFUMSF15AX001351) received from the user device 104 with the one or more pre-defined alternate/substitute characters based on the one or more substitution rules may then determine all matching VIN masks (first eight and the tenth characters of the VIN (5TFUMSF15AX001351)). In the current example case, the server 102 may determine two matching VIN masks, such as 5TFUM5F1_A and 5TEUM5F1_A. Then the server 102 may be configured to generate one or more new VINs using the VIN (5TFUMSF15AX001351) received from the user device 104, the one or more substitution rules, and the determined VIN masks such as 5TFUM5F1_A and 5TEUM5F1_A. The server 102 may generate the one or more new VINs as follows:

5TFUM5F1_A→5TFUM5F15AX001351
5TEUM5F1 A→5TEUM5F15AX001351
5TFUM5F1_A→5TFUM5F15AX001351
5TEUM5F1_A→5TEUM5F15AX001351

The server 102 upon generating the new VINs (as shown above) then determines the validity of each of the new VINs. The server 102 may determine whether the seventeen characters and/or letters in the new VINs are valid by examining a check digit in the new VINs. To examine the check digit, the server 102 may perform a redundancy check to identify if there are errors within the new VINs. For instance, the server 102 may calculate a check digit value for each of the new VINs based on values of other 16 characters in each of the new VINs. The server may then match the calculated value of the check digit for each of the new VINs with a ninth character value of the corresponding new VIN to determine the validity of each of the new VINs. Based on the check digit validation test, the server 102 may determine that only one of the new VIN (5TFUM5F15AX001351) is valid. In such a case, the server 102 may use the corrected new VIN (5TFUM5F15AX001351) instead of the VIN (5TFUMSF15AX001351) for processing the claim of the user.

In another example case, a server 102 may receive a digital application including a VIN of a damaged vehicle from a user device 104 operated by a user. The seventeenth character VIN may be 1FTYR14VAYTA92082. The server 102 may then determine whether the VIN (1FTYR14VAYTA92082) is valid. The server 102 may decode the VIN (1FTYR14VAYTA92082) by executing one or more transformation rules obtained from the database 108 on insignificant digits in VIN masks (first eight and the tenth characters of the VIN (1FTYR14VAYTA92082)). Based on the decoding of the VIN (1FTYR14VAYTA92082), the server 102 may then generate the following two new VINs:

1 FTYR14VY→1FTYR14VAYTA92082
1FTYR14VY→1FTYR14V4YTA92082

The server 102 upon generating the new VINs (as shown above) then determines the validity of each of the new VINs (as shown above). The server 102 may determine whether the seventeen characters and/or letters in the new VINs (as shown above) are valid by examining a check digit in the new VINs (as shown above). The check digit verification may be a redundancy check performed by the server 102 to identify if there are errors within the new VINs (as shown above). For instance, the server 102 may calculate a check digit value for each of the two new VINs (as shown above) based on values of other 16 characters in each of the two new VINs (as shown above). The server may then match the calculated value of the check digit for each of the two new VINs (as shown above) with a ninth character of the corresponding new VIN to determine the validity of each of the two new VINs (as shown above). Based on the check digit validation test, the server 102 may determine that only one of the new VIN (1FTYR14V4YTA92082) is valid. In such a case, the server 102 may use the corrected new VIN (1FTYR14V4YTA92082) instead of the VIN (1FTYR14VAYTA92082) for processing the digital application of the user.

In another embodiment, a server 102 on receiving a request from a user device 104 regarding processing of the digital application where information contained within the request may at least include a (VIN of a damaged vehicle, the server 102 may determine whether characters and/or letters in the received VIN are valid. The server 102 may determine whether the characters and/or the letters in the received VIN are valid by examining sixteen of the seventeen characters and/or letters in the received VIN on an assumption that a check digit (ninth character) of the received VIN is valid. Initially, the server 102 may determine one or more values that may replace each of the sixteen of the seventeen characters and/or letters in the received VIN expect for a check digit (ninth character) of the VIN to generate one or more new VINs that have a valid check digit. The server 102 may then execute one or more rules on the one or more new VINs. The one or more rules may correspond to a pre-defined list of values that shall be contained in each of the sixteen characters and/or letters in the one or more new VINs except for a check digit. For example, the positions 1-3 of the new VINs shall be a three-character code that identifies a manufacturer of a vehicle according to a standard developed by the Society of Automotive Engineers. The position 10 of the new VINs is a year code and may be limited to characters such as B, C, D, E, F, G, H, J, K, L, M, N, P, R, S, T, V, W, X, Y, 1, 2, 3, 4, 5, 6, 7, 8, 9 and A. Additionally, the positions 12-17 of the new VINs shall be a numeric serial number. The server 102 upon executing and/or applying the one or more rules on the new VINs may determine invalid new VINs from the new VINs, and then select a valid subset of new VINs from the new VINs by excluding the invalid new VINs. Upon determining a valid subset of new VINs, the server 102 may then decode a valid subset of new VINs using any known VIN decoding technique to identify at least one correct new VIN.

In one non-limiting example case, a server 102 may receive a digital application including a VIN of a damaged vehicle from a user device 104 operated by a user. The seventeenth character VIN may be JF1DA1L67H9812997. The server 102 may then determine whether the VIN (JF1DA1L67H9812997) is valid. The server 102 may decode the VIN (JF1DA1L67H9812997) by replacing one or more values in each of the sixteen of the seventeen characters and/or letters in the VIN (JF1DA1L67H9812997) expect a check digit ("7") of the VIN (JF1DA1L67H9812997) such that the check digit remains valid. For instance, the server 102 may replace values in a first position of the seventeen characters and/or letters in the received VIN (JF1DA1L67H9812997) such that the check digit is valid. The server 102 may generate four new VINs upon replacement of the values in the first position of the seventeen characters and/or letters in the VIN (JF1DA1L67H9812997) and the four new VINs are as follows:

1) 3F1DA1L67H9812997
2) CF1DA1L67H9812997
3) LF1DA1L67H9812997
4) TF1DA1L67H9812997

Similarly, the server 102 may generate four new VINs upon replacement of the values in the seventeenth position of the seventeen characters and/or letters in the received VIN (JF1DA1L67H9812997) and the four new VINs are as follows:

1) JF1DA1L67H9812994
2) JF1DA1L67H981299D
3) JF1DA1L67H981299M
4) JF1DA1L67H981299U

The server 102 may further similarly replace values in each position of the sixteen of the seventeen characters and/or letters in the VIN (JF1DA1L67H9812997), and generate forty-four new VINs that have a valid check digit. The server 102 may then execute one or more rules on the forty-four new VINs. As discussed above, the one or more rules may correspond to a pre-defined list of values that shall be contained in each of the sixteen characters and/or letters in the forty-four new VINs except for a check digit. The server 102 upon applying the one or more rules on the forty-four new VINs may determine new VINs, and then select a valid subset of new VINs from the forty-four new VINs by excluding the new VINs that are invalid. Upon determining the valid subset of new VINs, the server 102 may then decode the valid subset of new VINs using a VIN decoding technique to identify one correct new VIN (JF1VA1L67H9812997). Then the server 102 may use the correct new VIN (JF1VA1L67H9812997) instead of the incorrect VIN (JF1DA1L67H9812997) for processing the digital application of the user.

In yet another embodiment, a server 102, upon receiving a request from a user device 104 regarding processing of a digital application where the information contained within the request, may at least include a VIN of a damaged vehicle in question, initially the server 102 may determine whether characters and/or letters in the received VIN are valid. The server 102 may determine whether the characters and/or the letters in the received VIN are valid by examining seventeen VIN characters and/or letters in the VIN. In order to determine the validity of the VIN, the server 102 may transpose each of the seventeen VIN characters and/or letters in the VIN with each other, and generate a list of new VINs. The server 102 may then determine whether the seventeen characters and/or letters in the list of new VINs are valid in a number of ways. For example, the server 102 may determine whether the seventeen characters and/or letters in the list of new VINs are valid by examining a check digit in the list of new VINs. To examine the check digit, the server 102 may perform a redundancy check to identify if there are errors within each new VIN in the list of new VINs. The ninth position in each new VIN in the list of new VINs may represent a check digit of the new VIN. The server 102 upon performing the check digit verification on the list of new VINs may determine invalid new VINs that fail the check digit test, and then select a valid subset of new VINs from remaining list of new VINs by excluding the invalid new VINs. Upon determining the valid subset of new VINs, the server 102 may then decode the valid subset of new VINs using a VIN decoding technique to identify at least one correct new VIN.

In one non-limiting example case, a server 102 may receive a digital application including a VIN from a user device 104 operated by a user. The seventeenth character VIN may be 1FMJU1K5XBEF40827. The server 102 may then determine whether the VIN (1FMJU1K5XBEF40827) is correct/valid. The server 102 may decode the VIN (1FMJU1K5XBEF40827) by transposing each of the seventeen characters and/or letters in the VIN (1FMJU1K5XBEF40827). For instance, the server 102 may swap the values of the seventeen characters and/or letters in the VIN (1FMJU1K5XBEF40827) such that new VINs are generated. The server 102 may generate at least four new VINs upon swapping of the values in the seventeen characters and/or letters in the VIN (1FMJU1K5XBEF40827). The four new VINs are as follows:
1) F1MJU1K5XBEF40827
2) 1MFJU1K5XBEF40827
3) 1FJMU1K5XBEF40827
4) 1FMUJ1K5XBEF40827

The server 102 upon generating the new VINs (as shown above) then determines validity of each of the new VINs. The server 102 may determine whether the seventeen characters and/or letters in the new VINs are valid by examining a check digit in the new VINs. To examine the check digit, the server 102 may perform a redundancy check to identify if there are errors within the new VINs. The server 102 may calculate a check digit value for each of the new VINs based on values of remaining 16 characters in each of the new VINs. The server 102 may also match a calculated value of the check digit for each of the new VINs with a ninth character of the corresponding new VIN to determine the validity of each of the new VINs. Based on the check digit validation test, the server 102 may determine that at least one of the new VIN (for example, a VIN represented by MUMK5XBFE40827) is valid. In such a case, the server 102 may use the corrected new VIN (MUMK5XBFE40827) instead of the incorrect VIN (1FMJU1K5XBEF40827) for processing the digital application of the user.

Databases 108 are capable of storing information records in a plain format and/or an encrypted version containing data fields that are associated with a customer/user. The databases 108 may be in communication with a processor of a server 102 and a webserver 106, where the processor is capable of executing the various commands of the system 100. In some embodiments, the databases 108 may be part of the server 102. In some embodiments, the databases 108 may be a separate component in communication with the server 102.

The database 108 may be hosted on any number of computing devices including a non-transitory machine-readable storage medium, and capable of performing the various tasks described herein. As shown in FIG. 1, the database 108 may be accessed by the server 102 and other electronic devices of the system 100 via the one or more networks 112. The database 108 may be hosted on the same physical computing device functioning as the server 102 and/or functioning as other devices of the system 100. In some embodiments, the database 108 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the server 102 and/or components of the system 100.

The database 108 may store data records associated with various aspects of application services offered to end users/customers. Non-limiting examples of what may be stored in the database 108 may include user records that may include data fields describing users, e.g., customer data, such as customer credentials (e.g., username, passwords, biometrics, and encryption certificates), customer vehicle data, and information of customer's policies. A policy may refer to a contract between an insurer of a company and a user/customer who may be an owner of a vehicle. In exchange for payments from the user/customer, the insurer pays for damages to the insured, which are caused by acts or events as specified by the language of the policy. The payments from the user/customer are generally referred to as premiums, and typically are paid on behalf of the user/customer over time at periodic intervals. The amount of the damages payment is generally referred to as a coverage amount of the policy. The database 108 may further include document records that may include machine-readable computer files (e.g., word processing files), parsed portions of such computer files, or metadata associated with computer files; and application data that may include software instructions executed by the server 102 or data used by the applications executed by the server 102. The data records associated with various aspects of the application services offered to end users/customers may be organized within the database 104 according to user/customer profiles and types of policies.

The server 102 may access data within the database 108, for instance, by executing a query command related to a particular digital application submission of the user and responsive to the query command obtain information about the particular policy of the user. The server 102 may use the information retrieved from the database 108 to determine whether the VIN of the vehicle submitted by the user is valid and then further determine to process the digital application of the user.

Figure 2:
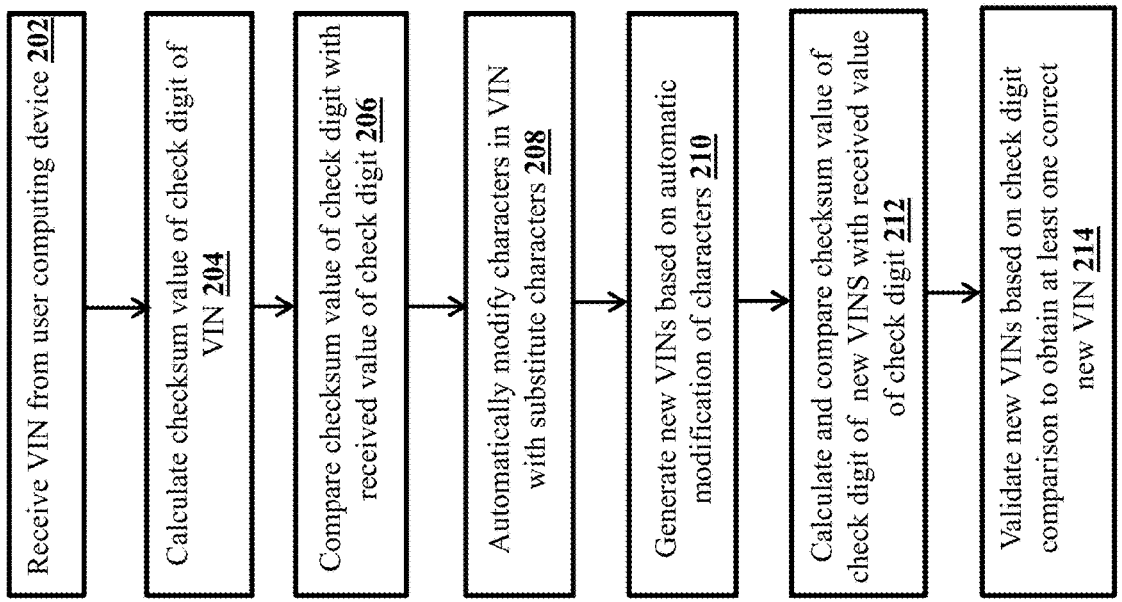
FIG. 2 shows a flow diagram of a method for verifying VINs, according to an embodiment.

FIG. 2 shows execution steps for verifying VINs, according to a method 200. The method 200 shown in FIG. 2 includes execution steps 202, 204, 206, 208, 210, 212, and 214. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a single server computer in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the server described herein.

In a first step 202, a server (or a server computer) may receive a request for processing an electronic file and/or a digital application from a user interface of a user computing device operated by a user. In one embodiment, the user may complete an online form on an executable a first web application/program using the user computing device to input data about a particular vehicle. The online form may pre-populate various fields, and once all the fields are completed, the user computing device generates the electronic file from the inputs and data in the various fields of the online form to transmit the electronic file to the server for further processing. The various data fields will include a VIN field that auto-populates with a previously scanned or inputted VIN. In another embodiment, the user may complete an online form using the user computing device to input data about a particular vehicle. The online form may pre-populate various fields, and once all the fields are completed, the user computing device transmits the inputs and data in the various fields of the online form to a first executable web application/program of the server for further processing. The server then generates the electronic file from the inputs and data in the various fields of the online form received from the user computing device. The various data fields will include a VIN field that auto-populates with a previously scanned or inputted VIN.

The electronic file may include vehicle data such as a VIN identifying a vehicle of the user. The electronic file may further include a device identifier uniquely identifying the user computing device operated by the user for generating and transmitting the request. The device identifier of the user computing device may be a phone number, an IP address, and/or a device ID of the user computing device. Initially, the server may verify an identity of the user from records stored in a database based on the information associated with the device identifier of the user computing device received within the electronic file.

The VIN information may specify attributes of a vehicle of a user such as a manufacturer of the vehicle, a world make identifier of the vehicle, a body type of the vehicle, an engine of the vehicle, a restraint system of the vehicle, a model year of the vehicle, and an assembly plant of the vehicle. The attributes of the vehicle may be specified using a plurality of characters located at a plurality of field positions in the VIN. The plurality of characters of the VIN may include seventeen characters and/or letters located in seventeen field positions in the VIN. The VIN may have a check digit located at a ninth field position in the VIN, and a VIN mask located at field positions one to eighth, and field position tenth in the VIN.

In a next step 204, a server upon receiving the seventeen characters and/or letters located in seventeen field positions in the VIN may then determine the VIN to be correct/valid. The server may determine the VIN in the electronic file to be valid by examining a check digit in the VIN. The ninth position in the VIN may represent the check digit in the VIN. The server may perform a check digit verification, which may be a redundancy check on the VIN to identify if there are errors within the VIN, such as a mistyped character or digit. During the check digit verification process, the server may calculate a checksum value of the check digit of the VIN based on values of remaining characters of the plurality of characters of the VIN using a pre-determined protocol/algorithm. The server may mathematically and arithmetically calculate the checksum value of the check digit based on the values of the remaining 16 characters in the VIN, i.e., the first through eighth and tenth through seventeenth characters. The sever may then execute one or more check digit verification protocols/algorithms to determine a checksum value of the check digit of the VIN.

In a next step 206, a server may compare the checksum value of the check digit with a received value of the check digit to verify the validity of the VIN. The server upon calculating the checksum value of the check digit based on the values of the other 16 characters in the VIN may compare the calculated value of the check digit with a ninth character of the VIN received from the user device in order to determine the validity/correctness of the VIN. In one embodiment, the server upon determining that the independently calculated value of the checksum of the check digit match with the ninth character of the VIN received from the user device, the server then validates the VIN received from the user device. In another embodiment, the server upon determining that the independently calculated value of the checksum of the check digit does not match with the ninth character of the VIN received from the user device, the server then confirms that the VIN received from the user device is invalid.

In a next step 208, in response to determining that the checksum value of the check digit does not match with the received value of the check digit, the server may then iteratively identify one or more characters in the VIN based on one or more substitution rules. The one or more substitution rules may include a list of pre-defined characters such as A, 4, 5, S, Z, 2, 8, B, G, F, 6, F, and E. The or more substitution rules may further indicate replacing the characters and/or letters, such as, but not limited to, "A" in the VIN received from the user device with 4 or vice-versa, "5" in the VIN received from the user device with S or vice-versa, "Z" in the VIN received from the user device with 2 or vice-versa, "8" in the VIN received from the user device with B or vice-versa, "G" in the VIN received from the user device 104 with 6 or vice-versa, and "F" in the VIN received from the user device with E or vice-versa. Upon the identification of the one or more characters in the VIN based on the list of pre-defined characters such as A, 4, 5, S, Z, 2, 8, B, G, F, 6, F, and E, the server may then automatically modify the one or more characters identified in the VIN with one or more pre-defined substitute characters based on the one or more substitution rules applicable to the one or more characters identified in the VIN.

In a next step 210, a server may iteratively generate one or more new VINs in response to automatic modification of the one or more characters identified in the VIN with the one or more pre-defined substitute characters. For instance, the server may generate the one or more new VINs such that each of the one or more new VINs may have at least one character of the plurality of characters replaced with at least one of the one or more corresponding pre-defined substitute characters.

In a next step 212, a server upon generating the new VINs may then determine the validity of each of the new VINs. The server may determine whether the seventeen characters and/or letters in the new VINs are valid by examining a check digit in the new VINs. To do the check digit verification, the server may perform a redundancy check to identify if there are errors within the new VINs. In order to examine the check digit in the new VINs, the server may calculate a checksum value of the check digit for each of the one or more new VINs based on values associated with remaining characters of the plurality of characters in each of the one or more new VINs using a pre-determined protocol/algorithm. The server may then compare the checksum value of the check digit for each of the one or more new VINs with a value of the check digit in each of the one or more new VINs to verify the validity of each of the one or more new VINs.

In a next step 214, a server may validate new VINs of the one or more VINs when the checksum value of the check digit of the new VINs matches with a value of the check digit of the new VINs. For instance, when only one of the independently calculated check digit values matches the ninth character of only one of the new VIN, then that new VIN is considered to be valid. In one embodiment, in response to validating the new VIN, the server may then transmit the new VIN on the user interface of the user computing device to reconfirm from the user regarding the correctness of the new VIN. In response to receiving the confirmation message from the user computing device regarding correctness of the new VIN, the server may then generate an instruction file containing one or more instructions associated with the execution of the request of the user. Upon successful generation of the instruction file, the server may then transmit the instruction file along with validated data in the electronic document containing at least the new and correct VIN to a second executable application/program for further processing of the validated data within the electronic file. In the illustrative process, the second executable application receives the electronic file only after validation of the VIN in the electronic file, including any automatic modifications, changes, or confirmations. In some cases, upon the successful generation of the instruction file, the server may then transmit the instruction file along with the electronic file containing at least the new and correct VIN to the second executable application/program for further processing of the validated data within the electronic file, such as processing a claim, assessing a value, or the like. In this illustrative embodiment, the electronic file is not transmitted to the second executable application for this processing until the VIN is validated and automatically modified if needed. The second executable application/program may be operated at a second server. In some cases, the second executable application/program may be operated at the user computing device.

In another embodiment, in response to validating the new VIN, the server may update the VIN in the electronic file with the new VIN, which has been validated. The server may then generate an instruction file containing one or more instructions associated with the execution of the request of the user. Upon successful generation of the instruction file, the server may then transmit the instruction file along with validated data in the electronic document containing at least the new and correct VIN to a second executable application/program for further processing of the validated data within the electronic file. In some cases, upon the successful generation of the instruction file, the server may then transmit the instruction file along with the electronic file containing at least the new and correct VIN to the second executable application/program for further processing of the validated data within the electronic file. The second executable application/program may be operated at a second server. In some cases, the second executable application/program may be operated at the user computing device.

Figure 3:
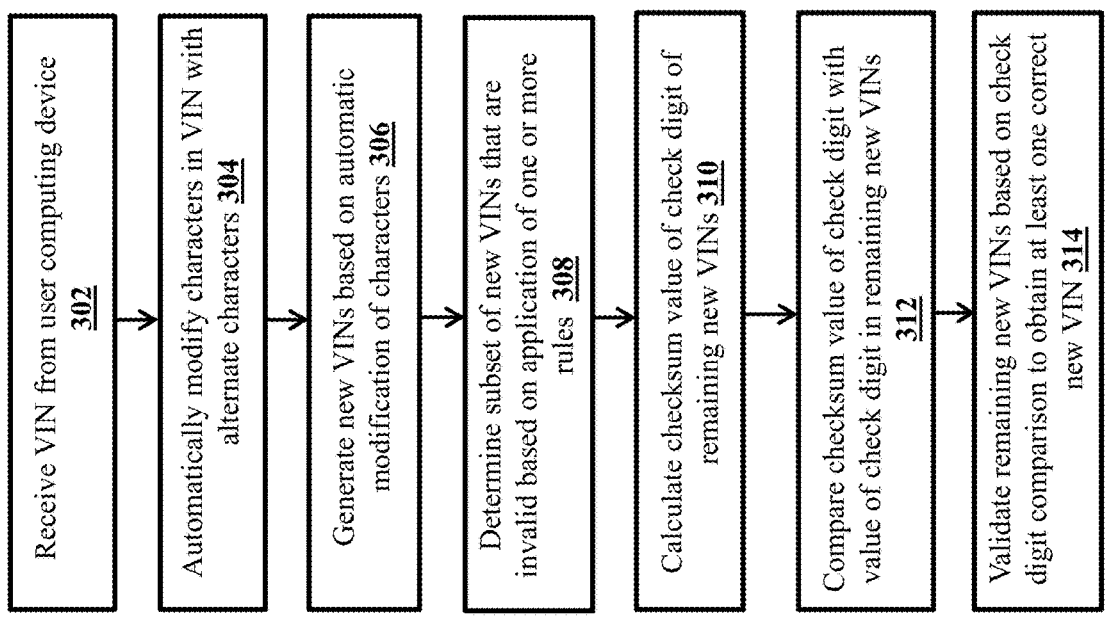
FIG. 3 shows a flow diagram of a method for verifying VINs, according to an embodiment.

FIG. 3 shows execution steps for verifying VINs, according to a method 300. The method 300 shown in FIG. 3 includes execution steps 302, 304, 306, 308, 310, 312, and 314. However, other embodiments may include additional or alternative execution steps, or may omit one or more steps altogether. The other embodiments may perform certain execution steps in a different order; steps may also be performed simultaneously or near-simultaneously with one another. In addition, the method 300 of FIG. 3 is described as being executed by a single server computer in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the server described herein.

In a first step 302, a server (or a server computer) may receive a request for processing an electronic file and/or a digital application from a user interface of a user computing device operated by a user. In one embodiment, the user may complete an online form on an executable a first web application/program using the user computing device to input data about a particular vehicle. The online form may pre-populate various fields, and once all the fields are completed, the user computing device generates the electronic file from the inputs and data in the various fields of the online form to transmit the electronic file to the server for further processing. The various data fields will include a VIN field that auto-populates with a previously scanned or inputted VIN. In another embodiment, the user may complete an online form using the user computing device to input data about a particular vehicle. The online form may pre-populate various fields, and once all the fields are completed, the user computing device transmits the inputs and data in the various fields of the online form to a first executable web application/program of the server for further processing. The server then generates the electronic file from the inputs and data in the various fields of the online form received from the user computing device. The various data fields will include a VIN field that auto-populates with a previously scanned or inputted VIN.

The electronic file may include vehicle data such as a VIN identifying a vehicle of the user. In some embodiments, the electronic file may also include a device identifier uniquely identifying the user computing device operated by the user for generating and transmitting the request. The device identifier of the user computing device may be a phone number, an IP address, and a device ID of the user computing device. Initially, on receiving the request, the server may verify the identity of the user from records stored in a database based on the information associated with the device identifier of the user computing device received within the request.

The VIN within the electronic file may specify attributes of a vehicle of a user such as a manufacturer of the vehicle, a world make identifier of the vehicle, a body type of the vehicle, an engine of the vehicle, a restraint system of the vehicle, a model year of the vehicle, and an assembly plant of the vehicle. The attributes of the vehicle may be specified using a plurality of characters located at a plurality of field positions in the VIN. The plurality of characters of the VIN may include seventeen characters and/or letters. For instance, the VIN may include a check digit located at a ninth field position in the VIN and a VIN mask located at field positions one to eighth and field position tenth in the VIN.

In a next step 304, a server may automatically modify each of a plurality of characters in a VIN except for a check digit with one or more alternate characters. For instance, the server may replace values in a first to eight field positions and tenth to seventeenth field positions of the seventeen characters and/or letters in the VIN with the one or more alternate characters.

In a next step 306, upon the replacement of the plurality of characters in the VIN with the one or more alternate characters, the server may then automatically generate one or more new VINs. The server may generate the one or more new VINs where each of the one or more new VINs may include the plurality of characters of the VIN such that at least one character of the plurality of characters is replaced with at least one of the one or more alternate characters.

In a next step 308, a server may determine a subset of new VINs from the one or more new VINs that are invalid based on execution of a set of rules. The set of rules may correspond to a pre-defined list of values to be contained in each position in the one or more new VINs. For example, according to set the rules, the field positions 1-3 of the new VINs shall be a three-character code that identifies the manufacturer of the vehicle according to a standard developed by the Society of Automotive Engineers. The field position 10 of the new VINs is the year code and shall be from the characters such as B, C, D, E, F, G, H, J, K, L, M, N, P, R, S, T, V, W, X, Y, 1, 2, 3, 4, 5, 6, 7, 8, 9 and A; and the field positions 12-17 of the new VINs shall be a numeric serial number. The server upon executing and/or applying the one or more rules on the new VINs may determine invalid new VINs, and then select a valid subset of new VINs from the new VINs by excluding the invalid new VINs.

In a next step 310, a server may then determine a validity of each of the remaining new VINs. The server may determine whether the seventeen characters and/or letters in the remaining new VINs are valid by examining a check digit in the remaining new VINs. In order to perform check digit verification, the server may perform be a redundancy check to identify if there are errors within the remaining new VINs. In order to examine the check digit in the remaining new VINs, the server may calculate a checksum value of the check digit for each of remaining new VINs of the one or more new VINs based on values of remaining characters of the plurality of characters of each of remaining new VINs of the one or more new VINs using a pre-determined protocol/algorithm.

In a next step 312, a server may compare the checksum value of the check digit for each remaining new VIN with a value of the check digit in each remaining new VIN to verify the validity of the remaining new VINs of the one or more new VINs.

In a next step 314, a server may validate new VINs of the remaining new VINs of the one or more new VINs when the checksum value of the check digit of the new VINs matches with the value of the check digit of the new VINs. For instance, when only one of the independently calculated check digit values matches the ninth character of only one of the new VIN, then that new VIN is presumed to be valid.

In one embodiment, in response to validating the new VIN, the server may then transmit the new VIN on the user interface of the user computing device to reconfirm from the user regarding the correctness of the new VIN. In response to receiving the confirmation message from the user computing device regarding correctness of the new VIN, the server may then generate an instruction file containing one or more instructions associated with the execution of the request of the user. Upon successful generation of the instruction file, the server may then transmit the instruction file along with validated data in the electronic document containing at least the new and correct VIN to a second executable application/program for further processing of the validated data within the electronic file. In some cases, upon the successful generation of the instruction file, the server may then transmit the instruction file along with the electronic file containing at least the new and correct VIN to the second executable application/program for further processing of the validated data within the electronic file. The second executable application/program may be operated at a second server. In some cases, the second executable application/program may be operated at the user computing device.

In another embodiment, in response to validating the new VIN, the server may update the VIN in the electronic file with the new VIN, which has been validated. The server may then generate an instruction file containing one or more instructions associated with the execution of the request of the user. Upon successful generation of the instruction file, the server may then transmit the instruction file along with validated data in the electronic document containing at least the new and correct VIN to a second executable application/program for further processing of the validated data within the electronic file. In some cases, upon the successful generation of the instruction file, the server may then transmit the instruction file along with the electronic file containing at least the new and correct VIN to the second executable application/program for further processing of the validated data within the electronic file. The second executable application/program may be operated at a second server. In some cases, the second executable application/program may be operated at the user computing device.

Figure 4:
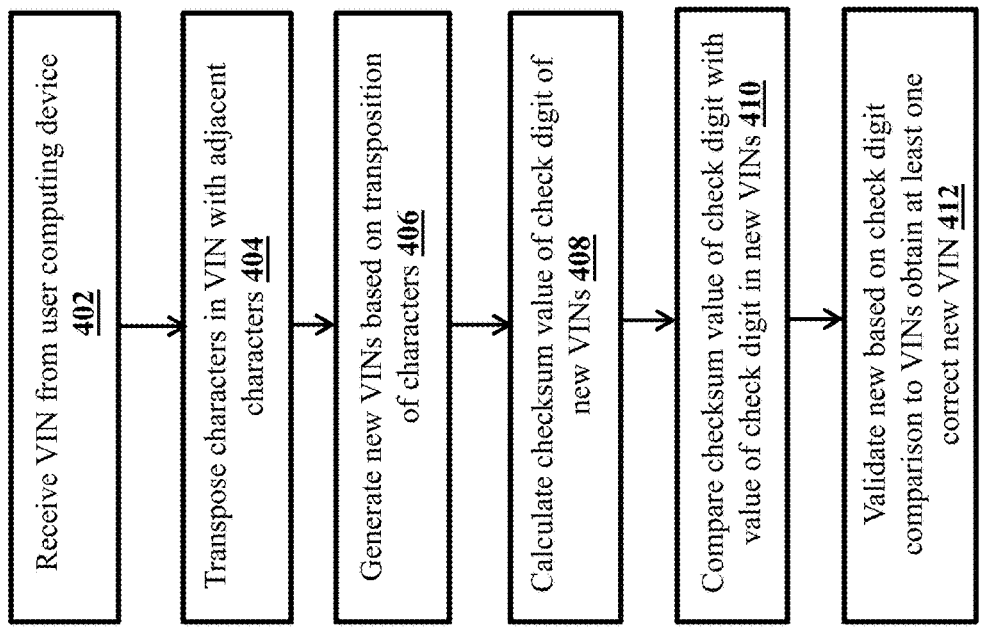
FIG. 4 shows a flow diagram of a method for verifying VINs, according to an embodiment.

FIG. 4 shows execution steps for verifying VINs, according to a method 400. The method 400 shown in FIG. 4 includes execution steps 402, 404, 406, 408, 410, and 412. However, other embodiments may include additional or alternative execution steps, or may omit one or more steps altogether. The other embodiments may perform certain execution steps in a different order; steps may also be performed simultaneously or near-simultaneously with one another. In addition, the method 400 of FIG. 4 is described as being executed by a single server computer in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the server described herein.

In a first step 402, a server (or a server computer) may receive a request for processing an electronic file and/or a digital application from a user interface of a user computing device operated by a user. In one embodiment, the user may complete an online form on an executable a first web application/program using the user computing device to input data about a particular vehicle. The online form may pre-populate various fields, and once all the fields are completed, the user computing device generates the electronic file from the inputs and data in the various fields of the online form to transmit the electronic file to the server for further processing. The various data fields will include a VIN field that auto-populates with a previously scanned or inputted VIN. In another embodiment, the user may complete an online form using the user computing device to input data about a particular vehicle. The online form may pre-populate various fields, and once all the fields are completed, the user computing device transmits the inputs and data in the various fields of the online form to a first executable web application/program of the server for further processing. The server then generates the electronic file from the inputs and data in the various fields of the online form received from the user computing device. The various data fields will include a VIN field that auto-populates with a previously scanned or inputted VIN.

The digital application may include a VIN identifying a vehicle of the user. In some embodiments, the digital application may also include a device identifier uniquely identifying the user computing device operated by the user for generating and transmitting the request. The device identifier of the user computing device may be a phone number, an IP address, and a device ID of the user computing device. The server may verify the identity of the user from records stored in a database based on the information associated with the device identifier of the user computing device received within the request.

The VIN may specify attributes of the vehicle of the user such as a manufacturer of the vehicle, a world make identifier of the vehicle, a body type of the vehicle, an engine of the vehicle, a restraint system of the vehicle, a model year of the vehicle, and an assembly plant of the vehicle. The attributes of the vehicle may be specified using a plurality of characters located at a plurality of positions in the VIN. The plurality of characters of the VIN may include seventeen characters and/or letters. For instance, the VIN may include a check digit located at a ninth position in the VIN and a VIN mask located at positions one to eighth and position tenth in the VIN.

In a next step 404, a server may transpose each of the plurality of characters in the VIN with each other. For instance, the server may exchange a position of each character of the plurality of characters in the VIN with the adjacent and/or the adjoining character. In one example, a character at a first field position in the VIN maybe replaced with a character at a second field position in the VIN and vice-versa. Similarly, a character at a 13th field position in the VIN maybe replaced with a character at a 14th position in the VIN and vice-versa.

In a next step 406, a server may generate one or more new VINs based on transposing of each of the plurality of characters in the VIN with each other. The server may generate the one or more new VINs where each of the one or more new VINs may include the plurality of characters of the VIN such that a position of at least one character of the plurality of characters is switched with a position of an adjacent character of the at least one character of the plurality of characters.

In a next step 408, a server may then determine the validity of each of the one or more new VINs. The server may determine whether the seventeen characters and/or letters in the one or more new VINs are valid by examining a check digit in each of the one or more new VINs. To do the check digit verification, the server may then perform a redundancy check to identify if there are errors within the one or more new VINs. In order to examine the check digit in the one or more new VINs, the server may calculate a checksum value of a check digit for each of the one or more new VINs based on values of remaining characters of the plurality of characters in each of the one or more new VINs using a pre-determined protocol/algorithm.

In a next step 410, a server may compare a checksum value of a check digit for each of one or more new VINs with a value of a check digit in each of the one or more new VINs to verify validity of the one or more new VINs.

In a next step 412, a server may validate a new VIN of the one or more new VINs when the checksum value of the check digit of the new VIN match with the value of the check digit of the new VIN. For instance, when only one of the independently calculated check digit values matches the ninth character of only one of the new VIN, then that new VIN is presumed to be valid.

In some embodiments, a server may collect additional relevant vehicle information form a user such as year, make, model, and/or body type of a vehicle. The server may then use all collected information to evaluate or generate new VINs. As described earlier, a VIN may include data indicating following vehicle attributes:

| 1 2 3 | 4 5 6 7 8 | 9 | 10 | 11 | 12 13 14 15 16 17 |
|---|---|---|---|---|---|
| WMI | Vehicle descriptor | Check digit | Model Year | Plant Code | Sequence Numbers |

The server may then use the collected data to eliminate the newly generated VINs that do not match the year, make, model, or the body type of the user's vehicle. For example, after receiving data indicating that the user's car has a model year of 2010, the server may eliminate any new VIN that does not indicate 10 as the model year. The server may also use the collected data when generating new VINs. For example, when generating new VINs, and after receiving data indicating that the user's car has a model year of 2010, the server may only generate new VINs that indicate 10 as the model year, and then the server may validate the new VIN.

In one embodiment, in response to validating the new VIN, the server may then transmit the new VIN on the user interface of the user computing device to reconfirm from the user regarding the correctness of the new VIN. In response to receiving the confirmation message from the user computing device regarding correctness of the new VIN, the server may then generate an instruction file containing one or more instructions associated with the execution of the request of the user. Upon successful generation of the instruction file, the server may then transmit the instruction file along with validated data in the electronic document containing at least the new and correct VIN to a second executable application/program for further processing of the validated data within the electronic file. In some cases, upon the successful generation of the instruction file, the server may then transmit the instruction file along with the electronic file containing at least the new and correct VIN to the second executable application/program for further processing of the validated data within the electronic file. The second executable application/program may be operated at a second server. In some cases, the second executable application/program may be operated at the user computing device.

In another embodiment, in response to validating the new VIN, the server may update the VIN in the electronic file with the new VIN, which has been validated. The server may then generate an instruction file containing one or more instructions associated with the execution of the request of the user. Upon successful generation of the instruction file, the server may then transmit the instruction file along with validated data in the electronic document containing at least the new and correct VIN to a second executable application/program for further processing of the validated data within the electronic file. In some cases, upon the successful generation of the instruction file, the server may then transmit the instruction file along with the electronic file containing at least the new and correct VIN to the second executable application/program for further processing of the validated data within the electronic file. The second executable application/program may be operated at a second server. In some cases, the second executable application/program may be operated at the user computing device.

Figure 5:
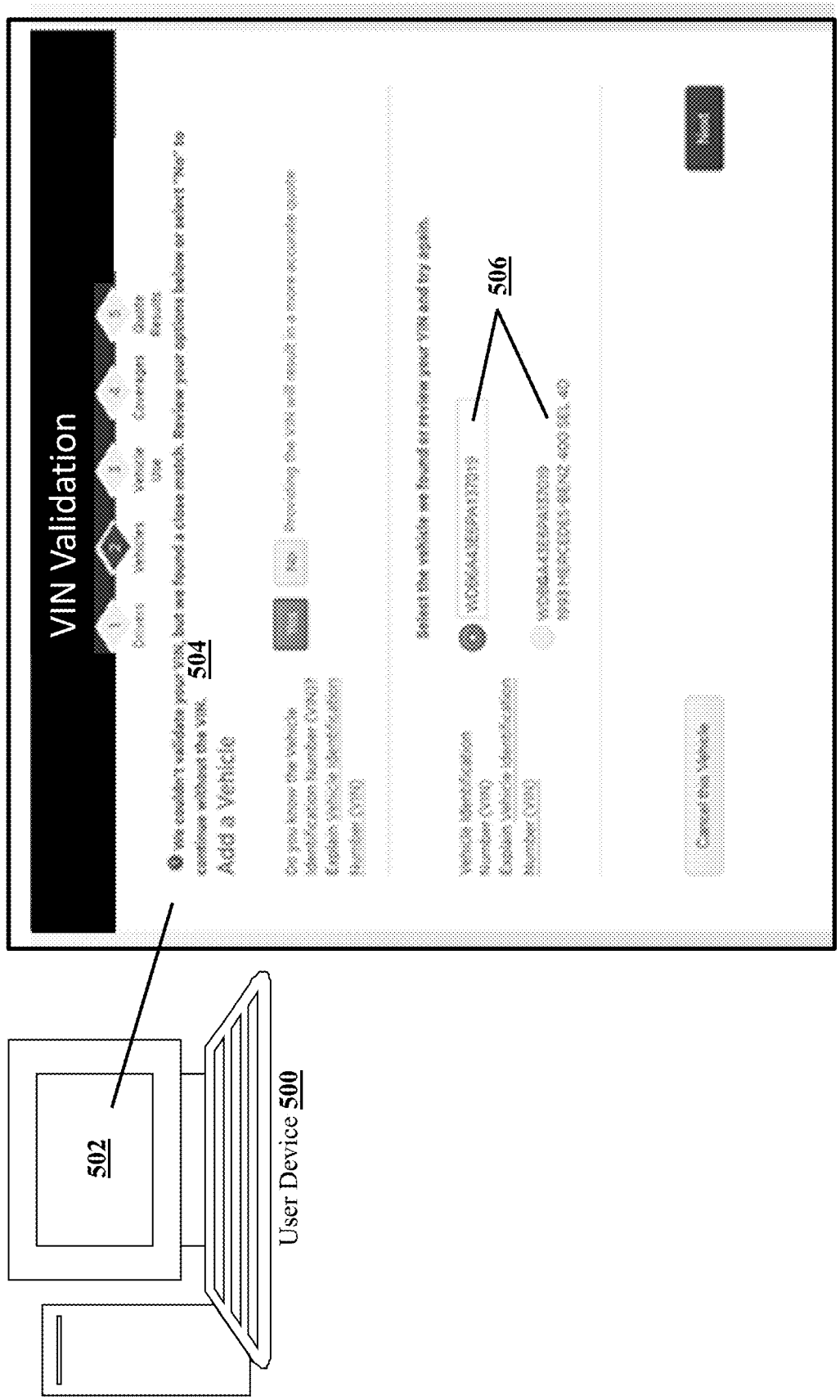
FIG. 5 shows a user interface of a user computing device, according to an embodiment.

FIG. 5 shows a user interface 502 of a user computing device 500. The user computing device 500 may be a portable or non-portable device, such as a desktop computer, a laptop computer, a tablet computer, a smart phone, a smart watch, a gaming console, a personal digital assistant, or the like. The user computing device 500 may include a processor/microcontroller and/or any other electronic component that performs one or more operations according to one or more programming instructions. The user computing device 500 may be capable of communicating with a system server through a communications network using wired or wireless communication capabilities.

The user computing device 500 may have access to one or more databases or pre-stored web-based interfaces, such as a first executable web application, including a number of preconfigured sub-interfaces, or containers, that are dynamically populated. For example, the first executable web application may contain code, such as HTML or PHP, presenting a website of any number of webpages having a common look-and-feel. One or more outputs or results may display the first executable web application that may contain additional code for containers.

A user may interact with the user computing device 500 to access the first executable web application and. In some implementations, the user computing device 500 may be configured to require user authentication based upon a set of user authorization credentials (e.g., username, password, biometrics, cryptographic certificate) to provide access to the first executable web application on the computing device. For example, the user computing device 500 may access a database configured to store the user credentials, which a webserver may be configured to reference in order to determine whether a set of entered credentials purportedly authenticating the user match an appropriate set of credentials that identify and authenticate the user. Similarly, in some implementations, the webserver may generate and serve the first executable web application to the user computing device 500 based upon a user membership account. In some embodiments, the webserver may generate and serve the first executable web application to the user computing device 500 based upon the user membership. In such implementations, the user membership may be defined by data fields in the user records stored in the database, and authentication of the user and the user membership may be conducted by the webserver by executing an access directory protocol.

During operation, a user may access the first executable web application by any common access method, e.g., keying in a URL, and submit user credentials to access an online form on the first executable web application. Upon a server authenticating the user using credentials that identify the user as a valid member, the user is presented the online form to transmit vehicle data such as VIN to the server. In some cases, a user may authorize the first executable web application to connect to one or more cameras and one or more databases, and obtain all or some of the data records to submit in the online form such as VIN of the vehicle. In such instances, the user computing device 500 retrieves all or some of the data records such as VIN of the vehicle, and populate the fields in the online form with retrieved vehicle data such as the VIN.

The user computing device 500 may then generate an electronic file corresponding to complete data in the online form, and transmit the electronic file to the server. In some cases, a server may directly receive all data within the completed form the user computing device 500 and then generate the electronic file corresponding to complete data in the online form. The server may then check for validity of the data within the electronic file. For instance, the server may check for validity of the VIN within the electronic file. In response to determining the VIN within the electronic file is not correct, the server may automatically execute one or more processes to generate a correct new VIN. Then the server may replace the original VIN within the electronic file with the correct new VIN. The server may then transmit the correct new VIN to the user interface 502 of the user computing device 500 to reconfirm the validity of the correct new VIN from the user. For instance, the server may transmit a message 504 along with a list of VINs 506 (both original VIN and the correct new VIN) to the user, which may be displayed on the user interface 502 of the user computing device 500. The user may then execute commands to select at least one VIN from the list of VINs 506. Upon the user selecting at least one VIN from the list of VINs 506, a confirmation message along with the user selected VIN may be automatically transmitted back to the server.

In a non-limiting embodiment, unless and until a correct VIN (e.g., validated VIN in accordance with the method described above) is identified and approved by the user (e.g., receiving an input from the user that the VIN is validated), the server may not display the next step of the online application depicted in FIG. 5.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:

receiving, by a server, from a computing device, an electronic file comprising a vehicle identification number (VIN) identifying a vehicle of a user, wherein the VIN comprises a plurality of characters where at least one character of the plurality of characters comprises a check digit;

calculating, by the server, a checksum value of the check digit based on values of remaining characters of the plurality of characters of the VIN using a pre-determined protocol;

comparing, by the server, the checksum value of the check digit with a received value of the check digit to verify the validity of the VIN, wherein the VIN is validated when the checksum value of the check digit matches the received value of the check digit;

in response to the server determining that the checksum value of the check digit does not match with the received value of the check digit, identifying, by the server, one or more characters in the VIN based on one or more substitution rules, wherein the one or more substitution rules are associated with a list of pre-defined substitute characters;

iteratively generating and selecting, by the server, one or more new VINs, in accordance with the one or more substitution rules, wherein with each iteration, the server:

automatically modifies at least one character of the one or more characters identified in the VIN with a corresponding substitute character from the list of pre-defined substitute characters based on the one or more substitution rules applicable to the one or more characters identified in the VIN;

generates a new VIN based on automatic modification of the at least one character identified in the VIN with the corresponding substitute character;

calculates a checksum value of a check digit for the new VIN based on values of remaining characters of a plurality of characters in the new VIN using the pre-determined protocol;

compares the checksum value of the check digit for the new VIN with a value of the check digit in the new VIN to verify the validity of the new VIN;

selects the new VIN when the checksum value of the check digit of the new VIN matches with the value of the check digit of the new VIN to validate the new VIN;

in response to validating the new VIN, updating, by the server, the VIN in the electronic file with the new VIN and transmitting, by the server, an instruction file along with validated data comprising at least the new VIN in the electronic file to an executable application, whereby the executable application receives the electronic file only after validation.

2. The server-implemented method according to claim 1, wherein the VIN comprises one or more attributes of the vehicle, and wherein the one or more attributes comprises at least a manufacturer of the vehicle, a world make identifier of the vehicle, a body type of the vehicle, an engine of the vehicle, a restraint system of the vehicle, a model year of the vehicle, and an assembly plant of the vehicle.

3. The server-implemented method according to claim 1, wherein the plurality of characters of the VIN comprises seventeen alphabets and letters.

4. The server-implemented method according to claim 3, wherein the plurality of characters of the VIN are located at a plurality of field positions in the VIN.

5. The server-implemented method according to claim 4, wherein the check digit is located at a ninth field position in the VIN.

6. The server-implemented method according to claim 4, wherein the VIN comprises a VIN mask located at field positions one to eighth and field position tenth in the VIN.

7. The server-implemented method according to claim 1, wherein the pre-determined protocol is a pre-determined software algorithm.

8. A server-implemented method comprising:

receiving, by a server from a computing device of a user, an electronic file comprising a vehicle identification number (VIN) identifying a vehicle, wherein the VIN comprises a plurality of characters located at a plurality of field positions where at least one character of the plurality of characters comprises a check digit;

calculating, by the server, a checksum value of the check digit based on values of remaining characters of the plurality of characters of the VIN using a pre-determined protocol;

comparing, by the server, the checksum value of the check digit with a received value of the check digit to verify the validity of the VIN, wherein the VIN is validated when the checksum value of the check digit matches the received value of the check digit;

in response to the server determining that the checksum value of the check digit does not match with the received value of the check digit, automatically transposing, by the server, each of the plurality of characters in the VIN with their adjacent character;

generating, by the server, one or more new VINs, wherein each of the one or more new VINs comprises the plurality of characters of the VIN where at least one character of the plurality of characters is automatically swapped with an adjacent character of the at least one character of the plurality of characters;

iteratively selecting, by the server, the one or more new VINS, in accordance with a set of rules, wherein with each iteration, the server calculates a checksum value of a check digit for each of the one or more new VINs based on values of remaining characters of the plurality of characters of each of the one or more new VINs using the pre-determined protocol;

compares the checksum value of the check digit for each of the one or more new VINs with a value of the check digit in each of the one or more new VINs to verify the validity of the one or more new VINs;

selects new VINs of the one or more new VINs when the checksum value of the check digit of the new VINs matches with the value of the check digit of the new VINs to validate at least one new VIN;

in response to validating the at least one new VIN, updating, by the server, the VIN in the electronic file with the at least one new VIN and transmitting, by the server, an instruction file along with validated data comprising at least the at least one new VIN in the electronic file to an executable application, whereby the executable application receives the electronic file only after validation.

9. The server-implemented method according to claim 8, wherein the VIN comprises one or more attributes of the vehicle, and wherein the one or more attributes comprises at least a manufacturer of the vehicle, a world make identifier of the vehicle, a body type of the vehicle, an engine of the vehicle, a restraint system of the vehicle, a model year of the vehicle, and an assembly plant of the vehicle.

10. The server-implemented method according to claim 8, wherein the plurality of characters of the VIN comprises seventeen alphabets and letters.

11. The server-implemented method according to claim 10, wherein the plurality of characters of the VIN are located at a plurality of field positions in the VIN.

12. The server-implemented method according to claim 11, wherein the check digit is located at a ninth field position in the VIN.

13. The server-implemented method according to claim 1, wherein the VIN comprises a VIN mask located at field positions one to eighth and field position tenth in the VIN.

14. The server-implemented method according to claim 8, wherein the pre-determined protocol is a pre-determined software algorithm.

15. A system comprising:
a computing device, and
a server in communication with the computing device, the server configured to:
receive from the computing device an electronic file comprising a vehicle identification number (VIN) identifying a vehicle of a user, wherein the VIN comprises a plurality of characters where at least one character of the plurality of characters comprises a check digit;
calculate a checksum value of the check digit based on values of the remaining characters of the plurality of characters of the VIN and compare the checksum value of the check digit with a received value of the check digit;
in response to the checksum value of the check digit not matching the received value of the check digit:
automatically modify each of the plurality of characters in the VIN except for the check digit with one or more alternate characters;
iteratively generate one or more new VINs, in accordance with the automatic modification of each of the plurality of characters in the VIN except for the check digit with the one or more alternate characters, wherein with each iteration, the server is further configured to modify at least one character of the plurality of characters in the VIN except for the check digit with an alternate character of the one or more alternate characters;
generate a new VIN based on modification of the at least one character of the plurality of characters in the VIN except for the check digit with the alternate character; determine whether the new VIN is invalid based on execution of a set of rules, wherein the set of rules correspond to a pre-defined list of values to be contained in each field position in the new VIN;
calculate a checksum value of a check digit for the new VIN if the new VIN is not invalid based on values of remaining characters of the plurality of characters of the new VIN using a pre-determined protocol;
compare the checksum value of the check digit for the new VIN with a value of the check digit in the new VIN to verify the validity of the new VIN;
select the new VIN when the checksum value of the check digit of the new VIN matches with the value of the check digit of the new VIN to validate the new VIN;
in response to validating the new VIN, updating, by the server, the VIN in the electronic file with the new VIN and transmitting, by the server, an instruction file along with validated data comprising at least the new VIN in the electronic file to an executable application, whereby the executable application receives the electronic file only after validation.

16. The system according to claim 15, wherein the VIN comprises one or more attributes of the vehicle, and wherein the one or more attributes comprises at least a manufacturer of the vehicle, a world make identifier of the vehicle, a body type of the vehicle, an engine of the vehicle, a restraint system of the vehicle, a model year of the vehicle, and an assembly plant of the vehicle.

17. The system according to claim 15, wherein the plurality of characters of the VIN comprises seventeen alphabets and letters.

18. The system according to claim 17, wherein the plurality of characters of the VIN are located at a plurality of field positions in the VIN.

19. The system according to claim 18, wherein the check digit is located at a ninth field position in the VIN.

20. The system according to claim 18, wherein the VIN comprises a VIN mask located at field positions one to eighth and field position tenth in the VIN.

* * * * *